United States Patent [19]

Obara

[11] Patent Number: 4,740,667
[45] Date of Patent: Apr. 26, 1988

[54] FLOW CONTROL VALVE FOR COOLING A WIRE ELECTRODE

[75] Inventor: Haruki Obara, Kanagawa, Japan

[73] Assignee: Fanuc Ltd, Minamitsuru, Japan

[21] Appl. No.: 752,104

[22] PCT Filed: Oct. 26, 1984

[86] PCT No.: PCT/JP84/00513
§ 371 Date: Jun. 25, 1985
§ 102(e) Date: Jun. 25, 1985

[87] PCT Pub. No.: WO85/01907
PCT Pub. Date: May 9, 1985

[51] Int. Cl.⁴ .................... B23H 7/02; B23H 1/10
[52] U.S. Cl. ................... 219/69 W; 219/69 D
[58] Field of Search .............. 219/69 D, 69 W; 204/206

[56] References Cited

U.S. PATENT DOCUMENTS

| 4,263,493 | 4/1981 | Kilcher | 219/69 D |
| 4,317,019 | 2/1982 | Itoh | 219/69 D |
| 4,367,400 | 1/1983 | Otto et al. | 219/69 D |
| 4,479,045 | 10/1984 | Inoue | 219/69 D |
| 4,481,095 | 11/1984 | Inoue | 219/69 V X |
| 4,507,532 | 3/1985 | Inoue | 219/69 D |
| 4,549,062 | 10/1985 | Inoue | 219/69 D |

FOREIGN PATENT DOCUMENTS

| 52-20498 | 2/1977 | Japan | 219/69 W |
| 53-145194 | 12/1978 | Japan | 219/69 C |
| 57-1624 | 1/1982 | Japan | 219/69 D |
| 57-102725 | 6/1982 | Japan | . |
| 138546 | 8/1982 | Japan | 219/69 D |
| 206323 | 12/1983 | Japan | 219/69 D |
| 223534 | 12/1983 | Japan | 219/69 D |
| 59-93240 | 5/1984 | Japan | 219/69 D |

Primary Examiner—A. D. Pellinen
Assistant Examiner—Geoffrey S. Evans
Attorney, Agent, or Firm—Staas & Halsey

[57] ABSTRACT

An wire electrode cooling apparatus in a wire cut discharge machine is provided for supplying a working fluid to a guide member which guides a wire electrode therethrough and cools the wire electrode. The working fluid is supplied to the guide member through a flow control valve. The opening of the flow control valve is controlled automatically or manually, either depending upon the pressure of the working fluid which changes in accordance with the electric spark forming speed. The pressure of the working fluid is optimally maintained at the electric spark forming region for high- and low-speed electric spark forming. At the same time, the flow rate of the working fluid supplied to the guide member is optimized, thereby preventing the wire electrode from being disconnected.

7 Claims, 2 Drawing Sheets

FLOW CONTROL VALVE FOR COOLING A WIRE ELECTRODE

FIELD OF THE INVENTION

The present invention relates to a wire electrode cooling apparatus in a wire cut electric discharge machine.

BACKGROUND OF THE INVENTION

A conventional wire cut electric discharge machine is operated such that a thin wire is used as an electrode and is kept taut, the wire and a workpiece are moved relative to each other, a voltage is applied between the wire electrode and the workpiece to generate an electric discharge, and the workpiece is melted by discharge energy, thereby performing electric spark forming. This operation is performed while a working fluid such as water is supplied to an electric spark forming region. The working fluid serves to insulate the wire electrode from the workpiece, eliminate powder from the melted workpiece, and prevent the wire from becoming disconnected due to heating of the wire by the electric discharge.

The working fluid is supplied by the mechanism shown in FIG. 1 to an electric spark forming region in a conventional wire cut electric discharge machine. Referring to FIG. 1, reference symbol W denotes a workpiece; and P, a wire electrode. Reference numeral 7 denotes an electric contact which is connected to a discharge current source E such as a capacitor charging circuit to supply the discharge current between the workpiece W and the wire electrode moving therethrough. Reference numeral 1 denotes a cylindrical nozzle for supplying the working fluid to the electric spark forming region between the workpiece W and the wire electrode P. The working fluid is supplied from a working fluid inlet port 4 to the electric spark forming region through a nozzle port 8. Reference numeral 2 denotes a cylindrical guide member for guiding the wire electrode P by a guide point 3. Reference numeral 5 denotes a cooling hole formed in the guide member 2 to receive the working fluid so as to cool the wire electrode P.

The nozzle 1, the guide member 2 and the like are vertically arranged such that the workpiece W is located thereabove, but below a second cylindrical nozzle 1'.

With the above arrangement, the working fluid is supplied from the working fluid supply port 4 to the nozzle 1 and sprayed from the nozzle port 8 to the electric spark forming region. The working fluid is also supplied from the wire electrode cooling hole 5 to the guide member 2 to cool the wire electrode P heated by discharge heat. The working fluid is then discharged from a hole 9 of a base 6.

According to the structure and operation described above, in order to increase the electric spark forming speed, the pressure of the working fluid is increased, and its flow speed is then increased, thereby easily eliminating powder deposited in a small gap between the wire electrode P and the workpiece W. However, in the conventional structure, even if the pressure of the working fluid is increased, the working fluid flows out from the holes 5 and 9. As a result, the pressure (i.e., the flow speed) of the working fluid in the electric spark forming region cannot easily be increased. When the size of the wire electrode cooling hole 5 is decreased to decrease leakage of the working fluid, thereby increasing the pressure and the flow speed of the working fluid to allow high speed electric spark forming, the amount of working fluid flowing into the guide member 2 through the wire electrode cooling hole 5 is decreased when the working fluid is supplied at a low pressure. As a result, the wire electrode P cannot be sufficiently cooled and may be disconnected, resulting in inconvenience.

SUMMARY OF THE INVENTION

It is an object of the present invention to eliminate the conventional drawbacks described above and to provide a wire electrode cooling apparatus in a wire cut electric discharge machine, wherein the wire electrode will not be disconnected, and high- and low-speed operations can be smoothly performed.

It is another object of the present invention to provide a wire electrode cooling apparatus wherein an amount of the working fluid supplied to the cooling section for cooling the wire can be adjusted in accordance with the pressure of the working fluid which changes upon a change in electric spark forming speed.

It is still another object of the present invention to provide a wire electrode cooling apparatus for automatically adjusting an amount of working fluid supplied to the cooling section in accordance with the pressure of the working fluid.

It is still another object of the present invention to provide a wire electrode cooling apparatus which allows manual adjustment of an amount of working fluid supplied to the cooling section.

It is still another object of the present invention to provide a wire electrode cooling apparatus for adjusting an amount of working fluid supplied to the cooling section in accordance with an external signal.

In order to achieve the above objects of the present invention, there is provided a wire electrode cooling apparatus in a wire cut discharge machine for supplying a working fluid to a guide member for guiding a wire electrode and cooling the wire electrode by the working fluid, wherein the working fluid is supplied through a flow control valve to the guide member from a working fluid supply port of a nozzle for spraying the working fluid to an electric spark forming region, the flow control valve being arranged to automatically control an opening thereof in accordance with the pressure of the working fluid, thereby supplying an optimal amount of working fluid to the guide member. The opening of the flow control valve can be manually adjusted. In addition, the opening can also be controlled in response to an external signal. The flow rate of the working fluid supplied to the nozzle can be controlled by the flow control valve in inverse proportion to that supplied to the guide member.

When the working fluid is supplied at a high pressure, the opening of the flow control valve is decreased, so that the working fluid is supplied to the guide member in a large amount, thereby preventing the working fluid pressure from being decreased. In addition, when high-precision machining is performed, i.e., when the working fluid is supplied at a low pressure, the opening of the flow control valve is increased to increase the flow rate of the working fluid supplied to the guide member. The wire can be optimally cooled to prevent disconnections.

DETAILED DESCRIPTION OF THE PREFERRED EMBODIMENTS

The present invention will be described in detail with reference to FIGS. 2 and 3.

Figure 1:
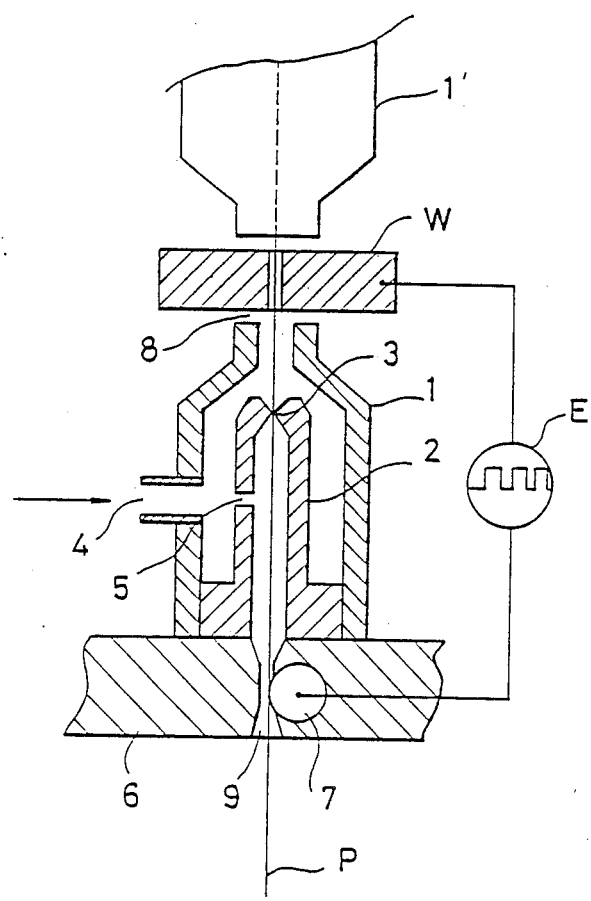
FIG. 1 is a sectional view of a conventional wire electrode cooling apparatus.
Figure 2:
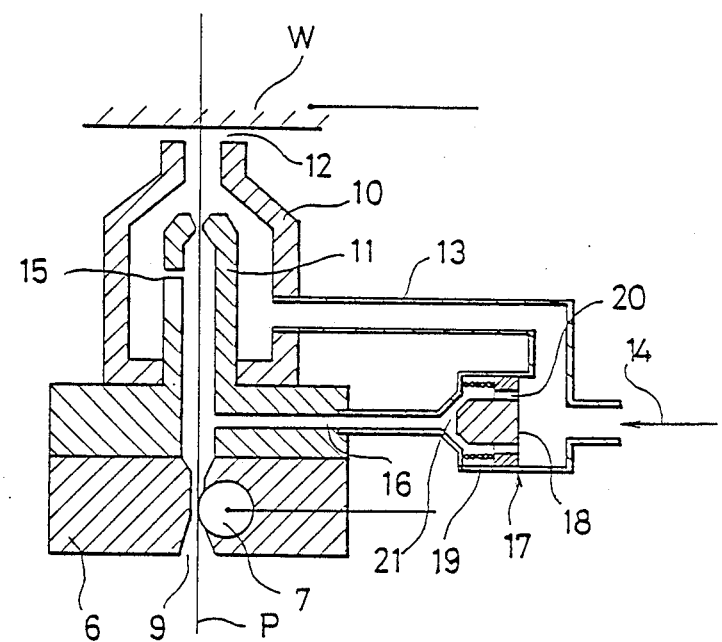
FIG. 2 is a sectional view of a wire electrode cooling apparatus according to an embodiment of the present invention.

FIG. 2 is a sectional view of a wire electrode cooling apparatus according to an embodiment of the present invention. The same reference numerals in FIG. 2 denote the same parts as in FIG. 1. Referring to FIG. 2, reference numeral 10 denotes a nozzle for spraying a working fluid from a nozzle port 12 to an electric spark forming region between a workpiece W and a wire electrode P. Reference numeral 11 denotes a guide member for guiding the wire electrode P extending through the nozzle 10. Working fluid is supplied to the guide member 11, and a hole 15 and a first pipe 16 are provided in the guide member 11. A second pipe 13 is connected to the nozzle 10, and to a working fluid supply port 14. The hole 15 receives the working fluid to cool the wire electrode P in the guide member 11. The hole 15 comprises a small hole for use with a high-pressure working fluid and causes the nozzle 10 to communicate with the guide member 11. The pipe 16 communicates with the working fluid supply port 14 through a flow control valve 17. The opening of the flow control valve 17 is decreased when the pressure of the working fluid is increased, so as to decrease the flow rate of the working fluid flowing through the pipe 16. In this embodiment, a valve body 18 is displaced by a spring 19 toward the working fluid supply side, so that the working fluid is supplied in the pipe 16 and the guide member 11 through the hole 20 formed in the valve body 18 and a path 21 connected to the pipe 16. When the pressure of the working fluid is increased, the valve body 18 is shifted to the left in FIG. 2 against the biasing force of the spring 19, thereby narrowing or closing the path 21 connected to the pipe 16 and hence decreasing the working fluid flowing from the pipe 16 to the guide member 11.

When the electric spark forming is performed at high speed, the high-pressure working fluid is supplied from the working fluid supply port 14 and sprayed from the nozzle port 12 to the electric spark forming region through the pipe 13 and the nozzle 10, thereby performing high-speed electric spark forming. Since the working fluid is supplied at a high pressure, the valve body 18 of the flow control valve 17 is shifted to the left in FIG. 2 against the biasing force of the spring 19, so that the path 21 connected to the pipe 16 is narrowed or closed. As a result, the working fluid flowing in the guide member 11 through the hole 20 of the valve body 18, the path 21 and the pipe 16 is decreased or stopped. However, when the pressure of the working fluid is high, the amount of working fluid flowing in the guide member 11 through the small hole 15 formed in the guide member 11 is increased. As a result, the working fluid supplied for cooling the wire electrode P is sufficient. The working fluid flowing in the guide member 11 flows out from the hole 9 formed in the base 6.

After high-speed electric spark forming is completed, low-speed electric spark forming such as a second cut is performed. In this case, the pressure of the working fluid is decreased. When the pressure of the working fluid is decreased, the flow rate of the wire electrode cooling working fluid flowing in the small hole 15 formed in the guide member 11 is decreased. Since the pressure of the working fluid is low, the valve body 18 of the flow control valve 17 is shifted to the right in FIG. 2 with the biasing force of the spring 19, thereby enlarging the path 21. In this case, the working fluid is supplied in the guide member 11 through the hole 20, the path 21, the pipe 16. The wire electrode P can be sufficiently cooled by the working fluid supplied from the hole 15 and the pipe 16, thereby preventing the wire electrode from overheating and being disconnected.

In the above embodiment, the small hole 15 is formed in the guide member 11. However, the wire electrode cooling working fluid can be supplied from the pipe 16 without forming the small hole 15.

Figure 3:
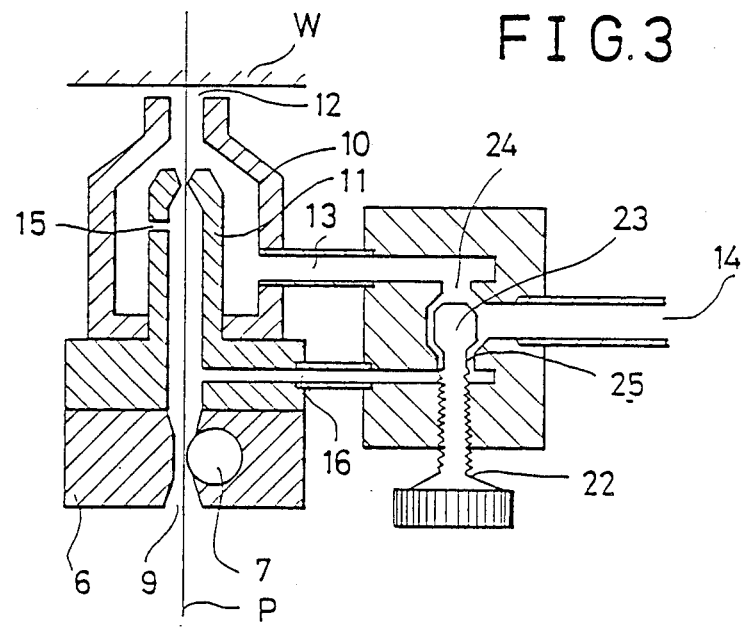
FIG. 3 is a sectional view of a wire electrode cooling apparatus according to another embodiment of the present invention.

FIG. 3 is a sectional view of a wire electrode cooling apparatus according to another embodiment of the present invention. The apparatus of FIG. 3 is substantially the same as that of FIG. 2, except that a manual flow control valve 22 is arranged in place of the flow control valve 17. When an operator screws a valve body 23 of the flow control valve 22 upward in FIG. 3, an inlet port 24 of a working fluid supply pipe 13 connected to a nozzle 10 is narrowed to decrease the flow rate of the working fluid supplied to the nozzle 10. On the other hand, an inlet port 25 to a wire electrode cooling working fluid pipe 16 connected to the guide member 11 is enlarged to increase the flow rate. When the valve body 23 is withdrawn, the port 24 is enlarged while the port 25 is narrowed. When high-speed electric spark forming is performed, the valve body 23 is moved downward in FIG. 3, and the port 25 of the pipe 16 is narrowed or closed, thereby increasing the flow rate of the working fluid supplied to the nozzle. As a result, high-speed electric spark forming can be performed. At the same time, since the pressure in the nozzle 10 is increased, the working fluid flowing in the guide member 11 through the hole 15 is increased. Even if the working fluid supplied from the pipe 16 is decreased or stopped, the wire electrode can be sufficiently cooled and will not be disconnected. For low-speed electric spark forming, the valve body 23 is moved upward in FIG. 3 to narrow the inlet port 24 and enlarge the inlet port 25. For this reason, the working fluid supplied to the nozzle 10 is decreased, and the working fluid supplied from the hole 15 to the guide member 11 is also decreased. Since the inlet port 25 is enlarged, the working fluid supplied through the pipe 16 is increased. The wire electrode P can be sufficiently cooled and will not be disconnected.

In this embodiment of FIG. 3, a manual flow control valve 22 is shown. However, an electromagnetic valve can be used in place of the manual flow control valve 22 and can be switched in response to an external signal. In the above embodiment, the flow rate of the working fluid supplied to the nozzle 10 is controlled by the flow control valve 22 in inverse proportion to that supplied to the guide member 11 from the pipe 16. However, the valve body 23 can be used to control the flow rate of the working fluid supplied from the pipe 16 to the guide member 11.

In the second embodiment of FIG. 3, the small hole 15 is formed in the guide member 11. However, the working fluid can be supplied through the flow control valve 22 and the pipe 16 without forming the hole 15.

What is claimed is:

1. A wire electrode cooling apparatus in a wire cut electric discharge machine having a guide member which is formed therein with an internal space through which a wire electrode extends for guiding the wire electrode, and a nozzle for supplying a working fluid to an electric spark forming region, said cooling apparatus being so arranged as to cool the guide member and a portion of the wire electrode within the guide member with part of the working fluid, which is supplied to the internal space of said guide member from a working fluid supply port communicated to said nozzle, comprising:

pipe means in fluid communication with said working fluid supply port for introducing said part of said working fluid into the internal space of said guide member to cool said portion of wire electrode and guide member; and flow control means disposed at an intermediate portion of said pipe means and operable to change an effective opening of said pipe means for variably controlling an amount of supply of said part of said working fluid which is supplied through said pipe means, wherein said flow control means includes a flow control valve operable for narrowing the effective opening of said pipe means with an increase in the pressure of the working fluid in the working fluid supply port.

2. An apparatus according to claim 1, wherein said flow control valve is controlled by an external signal.

3. An apparatus according to claim 1, wherein said flow control means comprises:

a manual flow control valve for controlling a flow rate of the part of said working fluid supplied to the internal space of the guide member.

4. An apparatus according to claim 1, wherein said flow control means comprises:

a flow control valve which is driven by an external signal to adjust a flow rate of the part of said working fluid supplied to the internal space of said guide member.

5. An apparatus according to claim 1, wherein said nozzle member is formed with a space for accommodating therein said guide member, said guide member having a peripheral wall with a hole formed therein which communicates said guide member with said nozzle.

6. A wire electrode cooling apparatus in a wire cut electric discharge machine having a guide member which is formed therein with an internal space through which a wire electrode extends for guiding the wire electrode, and a nozzle for supplying a working fluid to an electric spark forming region, said cooling apparatus being so arranged as to cool the wire electrode with the working fluid which is supplied to the internal space of said guide member from a working fluid supply port communicated to said nozzle, comprising:

first pipe means for communicating said working fluid supply port with the internal space of said guide member;

flow control means disposed at an intermediate portion of said first pipe means and operable to change an effective opening of said first pipe means for variably controlling an amount of supply of the working fluid which is supplied through said first pipe means;

a second pipe means for connecting said nozzle with said working fluid supply port; and said flow control means including a flow control valve which is disposed at an intermediate portion of said first pipe means and at an intermediate portion of said second pipe means, said flow control valve being operable to control both of said pipe means to have effective respective openings thereof in an inverse relation to each other.

7. An apparatus according to claim 6, wherein said flow control valve comprises:

a manual flow control valve.

* * * * *

UNITED STATES PATENT AND TRADEMARK OFFICE
CERTIFICATE OF CORRECTION

PATENT NO. : 4,740,667

DATED : Apr. 26, 1988

INVENTOR(S) : OBARA

It is certified that error appears in the above-identified patent and that said Letters Patent is hereby corrected as shown below:

FRONT PAGE OF PATENT

INSERT: [30] Foreign Application Priority Data

Oct. 27, 1983 [JP] JAPAN          58-199994

Signed and Sealed this

Sixteenth Day of August, 1988

Attest:

DONALD J. QUIGG

*Attesting Officer*          *Commissioner of Patents and Trademarks*